(12) United States Patent
Poll et al.

(10) Patent No.: US 7,360,800 B2
(45) Date of Patent: Apr. 22, 2008

(54) COMPRESSION CLAMP

(75) Inventors: Steven Allen Poll, Zeeland, MI (US); Edward Allen Brown, Jr., Holland, MI (US)

(73) Assignee: Trans-Matic Mfg. Co., Inc., Holland, MI (US)

(*) Notice: Subject to any disclaimer, the term of this patent is extended or adjusted under 35 U.S.C. 154(b) by 239 days.

(21) Appl. No.: 10/921,536

(22) Filed: Aug. 18, 2004

(65) Prior Publication Data
US 2005/0161941 A1    Jul. 28, 2005

Related U.S. Application Data

(63) Continuation-in-part of application No. 10/763,711, filed on Jan. 23, 2004, now Pat. No. 7,134,696.

(51) Int. Cl.
*F16L 33/00* (2006.01)
(52) U.S. Cl. .................. 285/242; 285/256; 285/36
(58) Field of Classification Search .............. 285/39, 285/259, 256, 93, 382, 242
See application file for complete search history.

(56) References Cited

U.S. PATENT DOCUMENTS 2,284,365 A * 5/1942 Briegel .................. 285/382
2,978,263 A * 4/1961 Walsh et al. .............. 285/256
4,315,348 A   2/1982 Oetiker et al.
4,948,178 A   8/1990 Sauer et al.
5,722,150 A * 3/1998 Swanson, III ............ 285/256
6,240,603 B1  6/2001 Craig
6,421,905 B1* 7/2002 Feher .................... 285/256
2005/0161939 A1* 7/2005 Poll ....................... 285/93

FOREIGN PATENT DOCUMENTS

DE    30 03 368 A1   8/1981
GB    2 049 856 A    12/1980

* cited by examiner

*Primary Examiner*—Aaron Dunwoody
(74) *Attorney, Agent, or Firm*—Butzel Long

(57) ABSTRACT

A one-piece unitary compression clamp for securing a pipe or tube on a fitting. The clamp may include at least one inward deformation that provides an interference fit between the clamp and the pipe or tube. Consequently, the clamp cannot fall off the pipe or tube before being permanently crimped, and the fitting is prevented from falling out of the tube. In a second embodiment, the clamp includes an ear for crimping the clamp to the tube, and a tongue within the clamp and overlying the mouth of the ear to provide uniform compression around the entire tube.

16 Claims, 12 Drawing Sheets

COMPRESSION CLAMP

This application is a continuation-in-part of application Ser. No. 10/763,711, filed Jan. 23, 2004, (now U.S. Pat. 7,134,696).

BACKGROUND OF THE INVENTION

The present invention is related to compression clamps, and more particularly to compression clamps used in pipe connections.

Compression clamps are well known for connecting a section of pipe or tubing to a fitting. The current method is a metal band that is positioned and crimped onto the end of a pipe or tube to secure the tube to a fitting. The pipe may be plastic, such as polyethelyne cross linked (PEX), or another suitable material. The clamp is crimped using a specially designed tool. These clamps may be used in a wide variety of applications including recreational vehicles, manufactured homes, marine crafts, stick built homes, and beverage dispensing machines.

The proper positioning of the compression clamps on the pipe ends is important. Accordingly, the present clamps are designed to enhance the likelihood that the clamp will be properly positioned. One such clamp is sold by Stadler-Viega of Bedford, Mass. under the Pureflow trademark. As illustrated in FIGS. 1 and 2, this clamp 100 includes a shoulder 110 at one end 120 to provide a positive stop for the pipe 130 within the clamp. The clamp also defines a "witness window" 115 to permit visual observation and confirmation that the pipe is properly positioned within the clamp end against the flange 110. The flange 110 assists in properly positioning the clamp on the tube end.

Unfortunately, there are difficulties in the installation of conventional compression clamps. After a clamp is placed on the end of the pipe, it must be physically held in place until the fitting is inserted into the pipe and the clamp is compressed, which requires two hands. If this is not done, the clamp may fall off the tube or become incorrectly oriented on the tube and the fitting may slide out of the tube. This problem is exacerbated when the installation of a clamp is attempted in a tight space, because the user may only be able to reach the pipe and the clamp with one hand, leaving one or no hands to make the connection with an install tool.

Another difficulty is that conventional connectors like those shown in FIGS. 1 and 2 require specially designed tools that surround the entire connector. This necessitates carrying a number of differently sized crimping tools to accommodate different pipe sizes. In order to reduce the need for multiple crimping tools, some manufacturers supply the connector with a crimping ear, for example, a U-shaped section extending outwardly from the connector that can be crimped with a conventional crimping tool. A single tool can crimp the ears of many different size pipes. However, especially under pressure and certain environmental conditions, these connectors have a tendency to leak in the area of the crimped ear.

SUMMARY OF THE INVENTION

The aforementioned installation problems are overcome in a first aspect of the invention wherein a compression clamp is provided with an inward deformation that provides a friction fit or an interference fit between the clamp and the outer surface of the pipe.

In this embodiment, the inward deformation is a plurality of longitudinal ribs evenly spaced about the circumference of the clamp. As the clamp is placed on the pipe, the ribs engage the outer surface of the pipe creating friction and thereby preventing the clamp from falling off the pipe prematurely. At the same time, the ribs may create a slight inward pressure on the pipe, which may in turn press against the fitting inside the pipe and prevent the fitting from falling out of the pipe.

This embodiment provides a number of advantages over conventional compression clamps. First, users of the present invention are no longer required to hold the clamp in position on the pipe, or to keep the pipe in an upright position prior to placing the pipe onto the fitting. Second, the inward deformation aids in preventing the clamp from slipping, moving, or being pushed out of position before the crimp is performed. Third, the number of clamps lost inside walls or compartments where pipes are located will be reduced, because clamps will be less likely to fall off the pipe after they are placed there. Fourth, installation of clamps in tight spaces is much easier with the present invention, because the same hand can be used to place the clamp on the pipe, then insert the fitting, and then crimp the clamp. Fifth, the inward deformation contributes to a stronger connection between the pipe and the fitting or other object inside the pipe.

The aforementioned crimping problems are overcome in a second aspect of the invention wherein a compression clamp is provided with an integral crimping ear and an integral tongue inside the clamp under the mouth of ear.

In this embodiment, the tongue is located between the ear and the pipe, overlying the mouth of the ear. The tongue reduces the likelihood of leakage by providing compression around the entire circumference of the pipe by bridging the mouth of the ear.

In a more specific embodiment, the tongue is connected to the ear by a strap including a score line that allows the strap to flex outwardly when the ear is crimped. The flexed strap provides an accessible location to cut the strap to remove the tongue and ultimately to remove the connector if necessary, for repairs of replacement.

These and other objects, advantages, and features of the invention will be readily understood and appreciated by reference to the detailed description of the current embodiments and the drawings.

DETAILED DESCRIPTION OF THE CURRENT EMBODIMENTS

Figure 1:
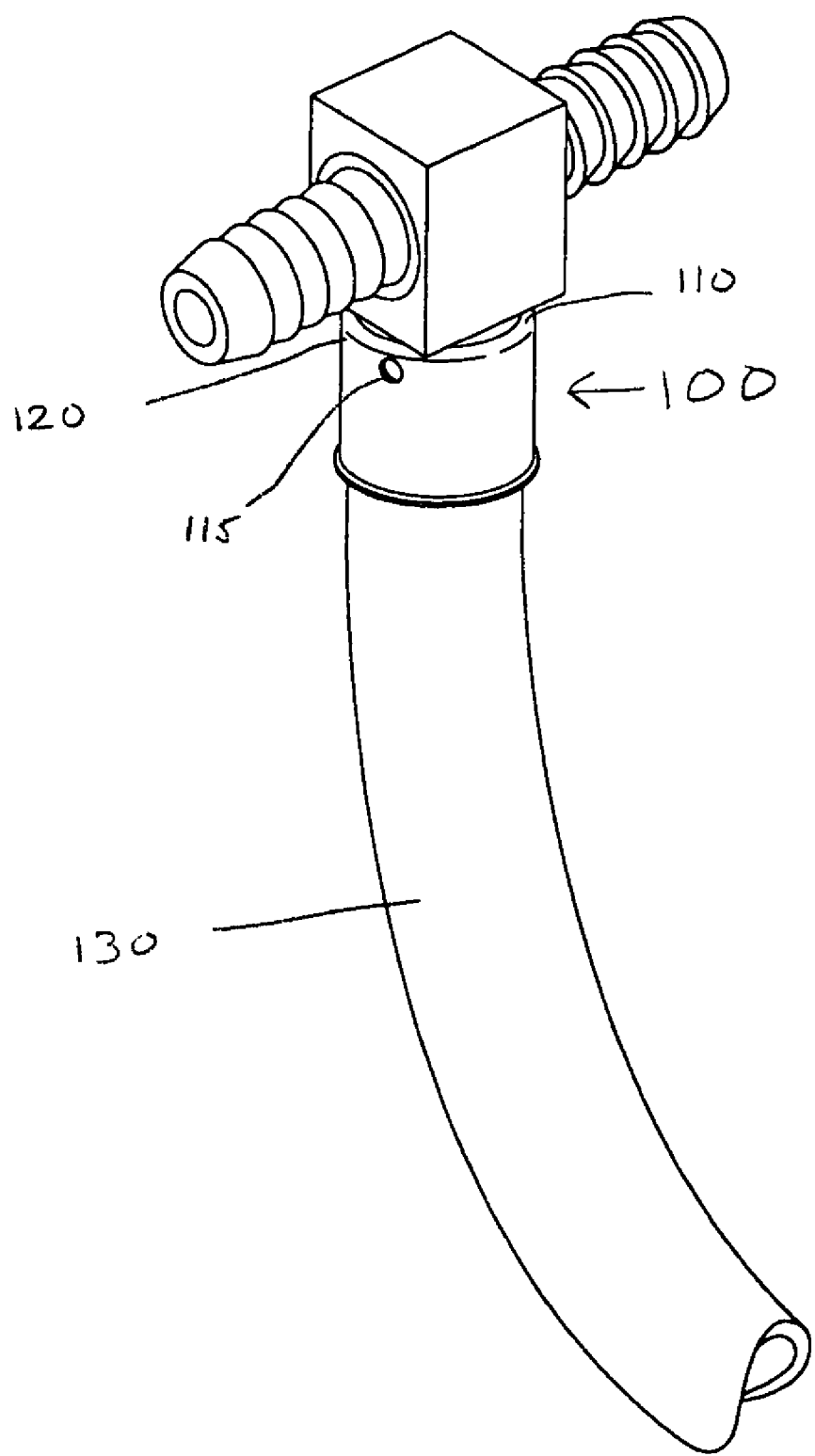
FIG. 1 is a perspective view of a prior art clamp in combination with a pipe and a fitting.
Figure 2:
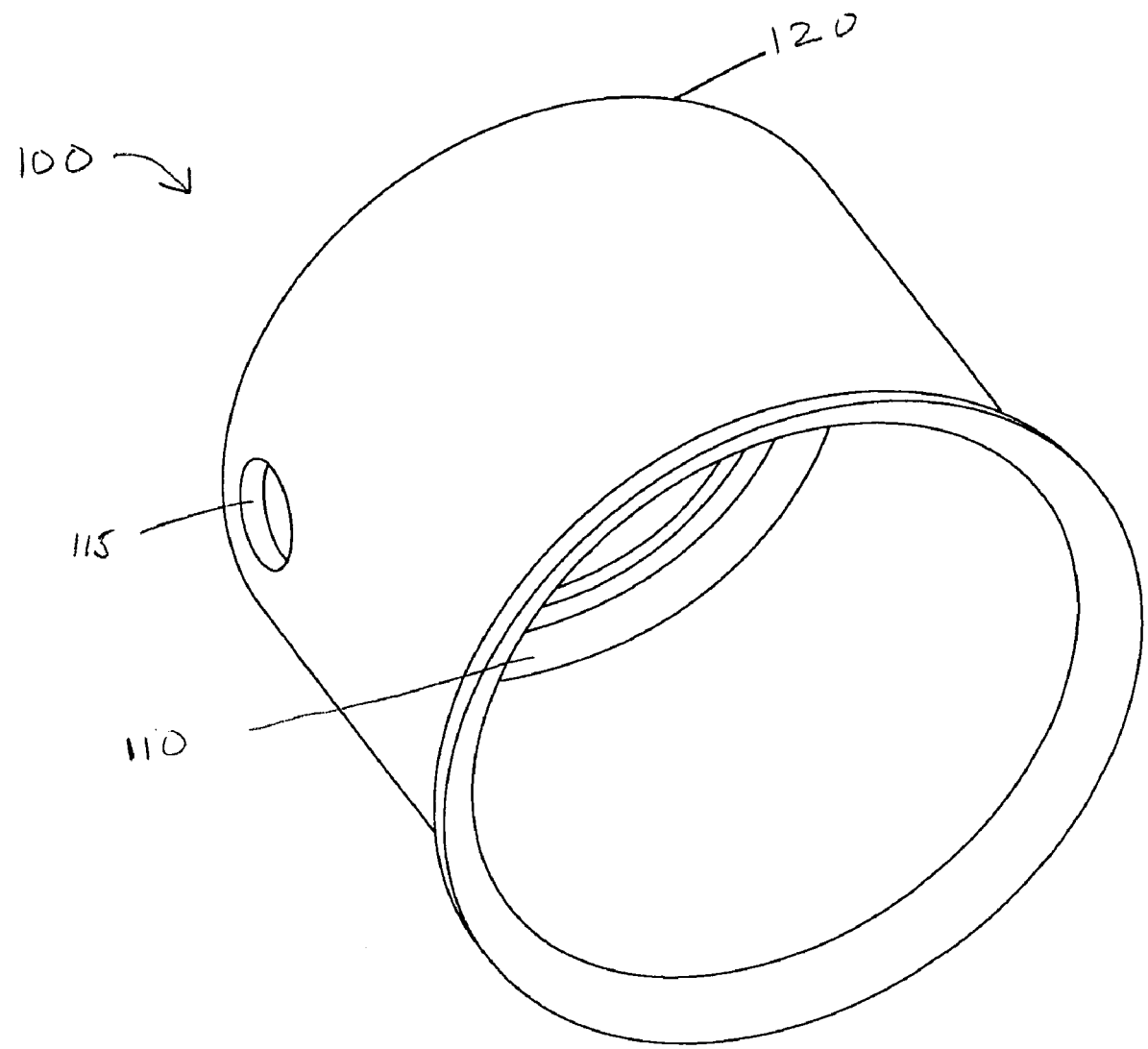
FIG. 2 is a perspective view of the prior art clamp.
Figure 3:
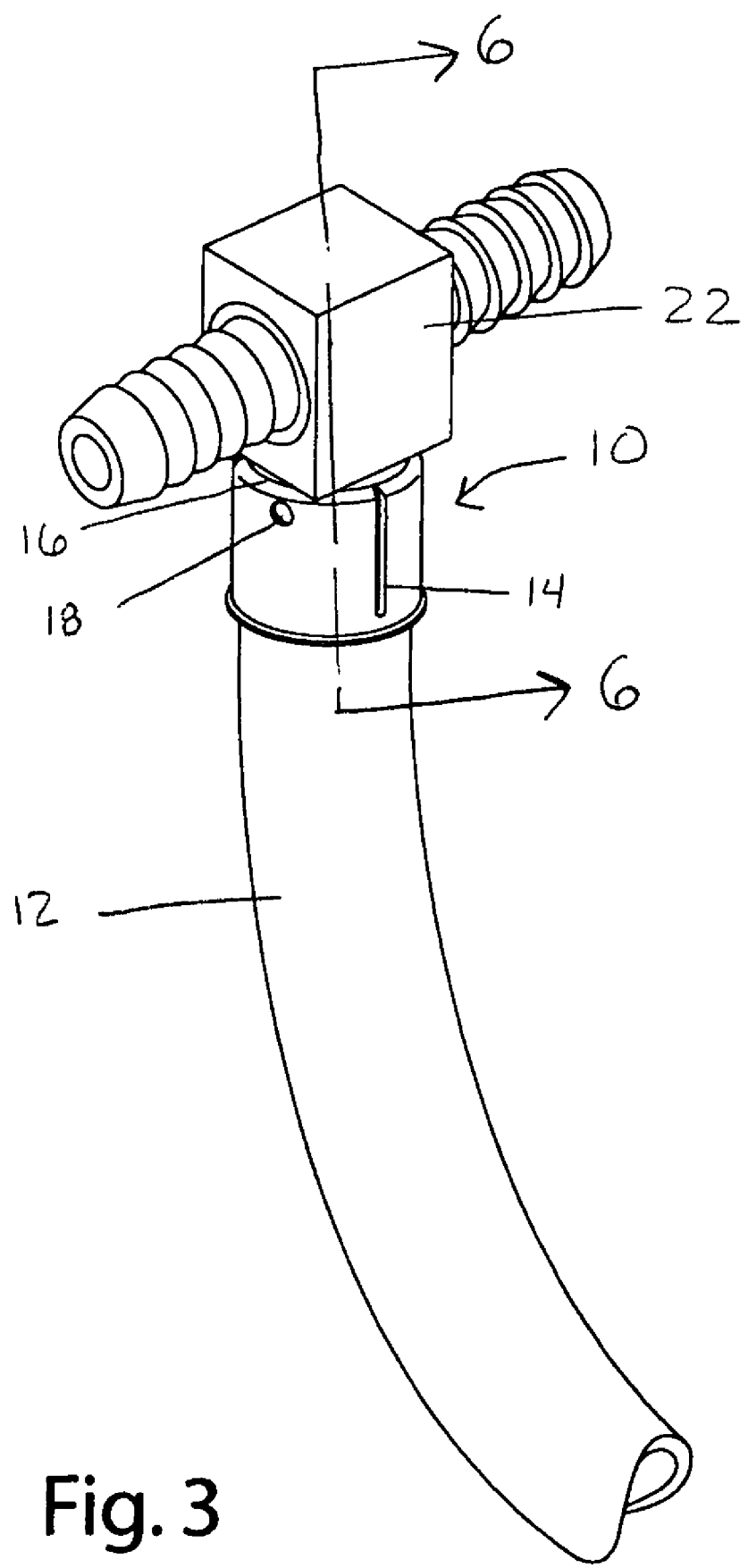
FIG. 3 is a perspective view of the clamp of the present invention in combination with a pipe and a fitting.

A compression clamp in accordance with one embodiment of the present invention is shown in FIG. 3 and generally designated 10. The clamp 10 is preferably a metal band that is clampable of slidably fitting over a pipe or tube 12. The clamp 10 preferably includes a plurality of spaced apart ribs 14, a positive stop flange 16, and a witness window 18. In operation, the clamp 10 is placed over the end of a pipe 12, and a fitting 22 is inserted into the clamp 10 at the same end of the pipe 12. The clamp 10 is then crimped with a crimping tool (not shown) to compress the clamp 10 about the pipe 12 and the fitting 22, securing the fitting 22 inside the pipe 12.

I. Structure

Figure 6:
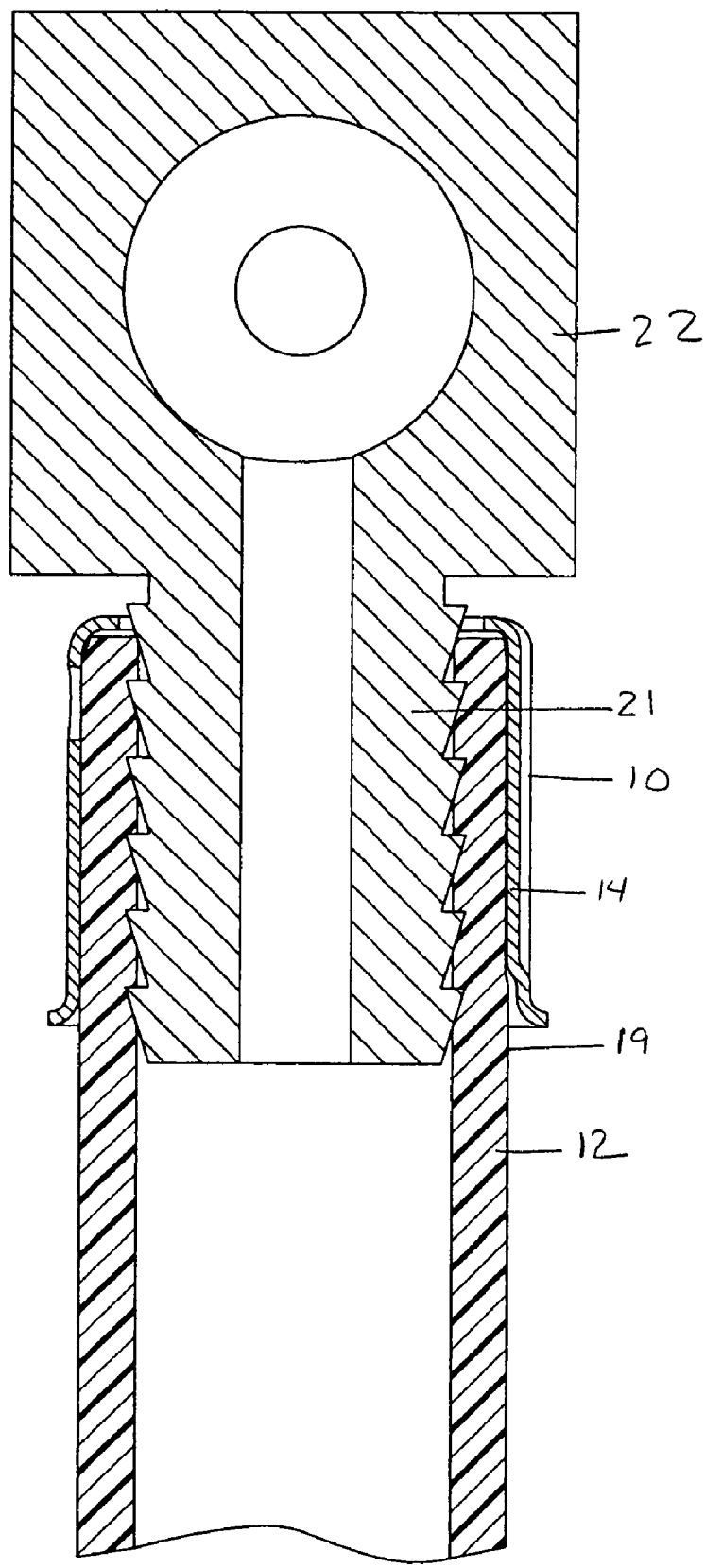
FIG. 6 is a sectional view taken along line 6-6 in FIG. 3.
Figure 7:
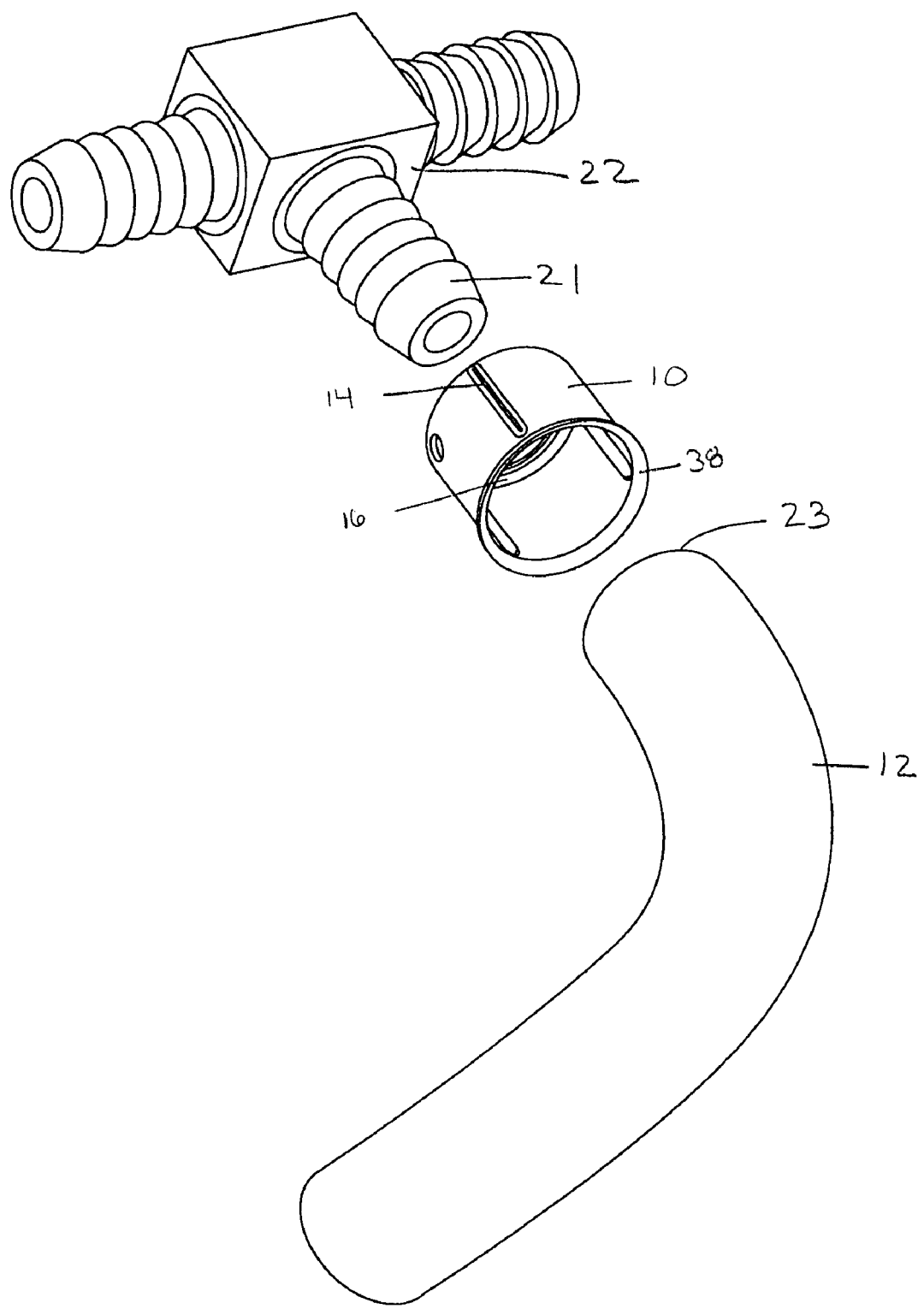
FIG. 7 is a perspective exploded view of FIG. 3.

Shown in FIGS. 6 and 7, the pipe 12 is well known and generally comprised of, but not limited to, plastic, such as PVC or PEX (cross linked polyethylene). The pipe includes an outer surface 19, and an end 23 that will receive the clamp 10. Depending on the desired application, the pipe may be a rigid or flexible, and may have a variety of standard sizes. The fitting 22 is also well known and is available in standard sizes. They are generally comprised of a metal, such as brass, or plastic, and include at least one insert 21 having a diameter slightly smaller than the inner diameter of the pipe 12 such that it can be inserted into the end 23 of the pipe 12. The T-shaped fitting 22 shown is intended to be exemplary of just one type of such pipe fittings.

Figure 4:
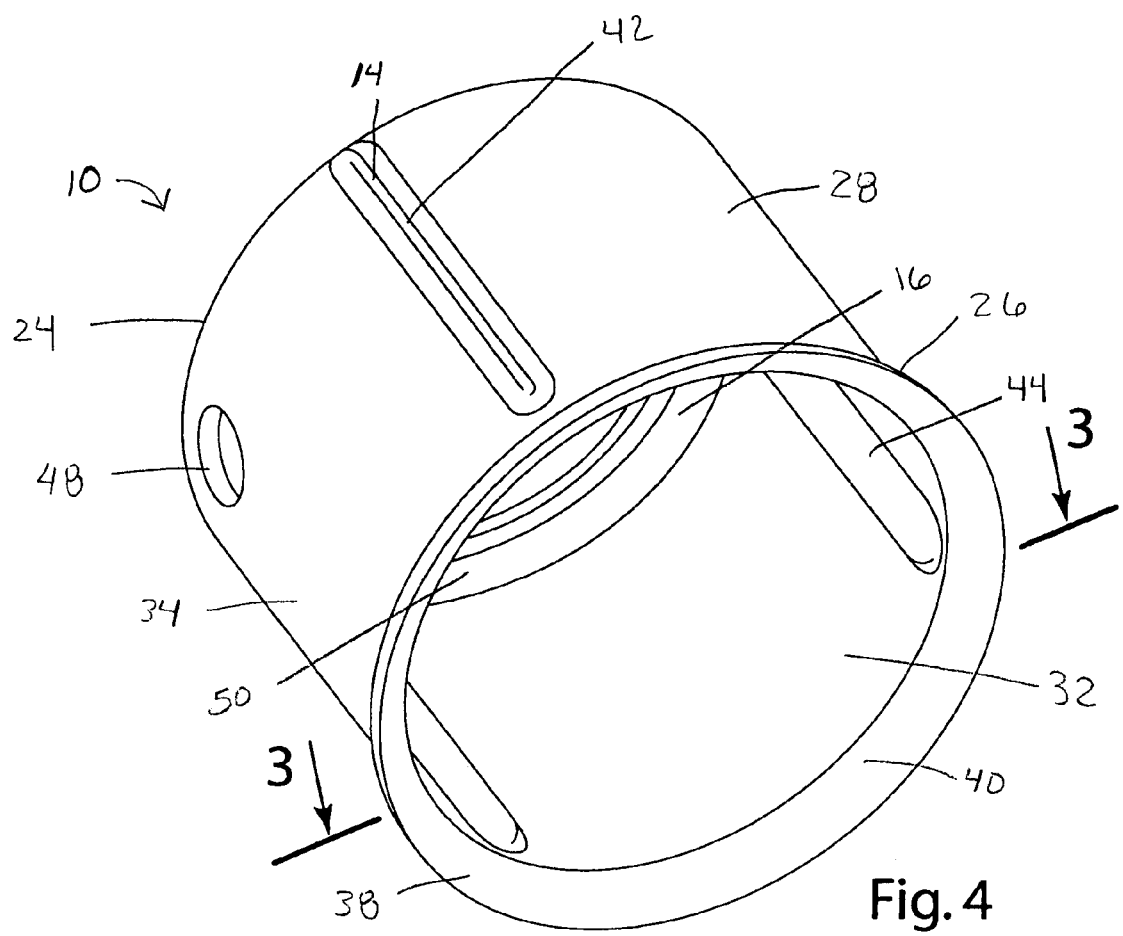
FIG. 4 is a perspective view of the clamp.

As shown in FIG. 4, the clamp 10 is generally a metal band having a circumference of any desired size so that it fits over a desired pipe or tube. The clamp 10 includes a first end 24, a second end 26, and a side wall 28 extending between the first end 24 and second end 26. The width of the side wall between the first and second ends 24 and 26 may vary with the desired application. The side wall 28 also includes an inner surface 32, an outer surface 34. In the preferred embodiment, a lip 38 extends radially outward from the second end 26. The lip 38 includes a radius 40 that forms a smooth transition with the side wall 28.

Figure 5:
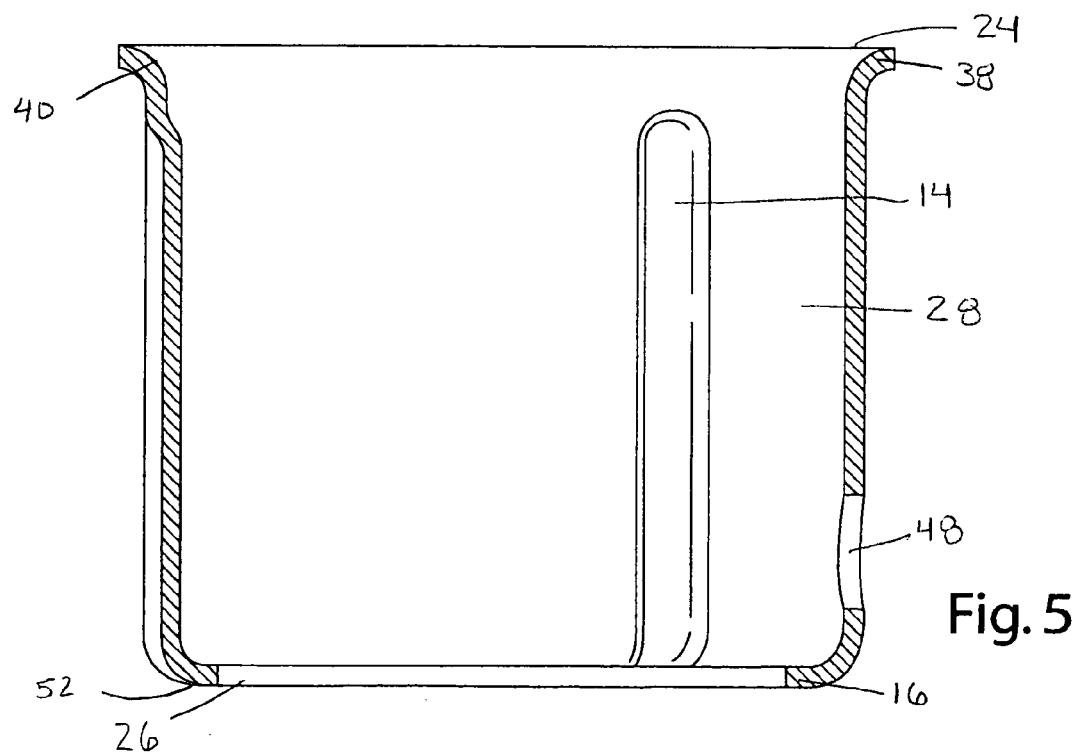
FIG. 5 is a sectional view taken along line 3-3 in FIG. 4.

The side wall 28 also includes a plurality of inward deformations. As shown in FIGS. 4 and 5, in the preferred embodiment, the inward deformations are a plurality of ribs 14. The ribs 14 preferably extend across the substantial width of the side wall 28, forming an indentation 42 in the outer surface 34 and a corresponding protrusion 44 on the inner surface 32. The depth of the protrusion 44 may vary depending on the desired interference between the ribs 14 and the pipe 12. In a preferred embodiment, three ribs 14 are spaced evenly about the sidewall 28. However, any number of ribs 14 may be used, and the ribs 14 may have a different orientation, such as running circumferentially about the clamp 10. Alternatively, the inward deformations may be a number of dimples, or a differently shaped inward deformation that creates a friction fit between the clamp 10 and the pipe 12.

In the preferred embodiment, a positive stop flange 16 extends radially inward from the first end 24 of the clamp 10. The flange 16 preferably extends around the entire circumference of the clamp 10, having an inner surface 50, and an outer surface 52. The depth of the flange 16 is approximately the same, but not greater than, the thickness of the pipe 12, so that the fitting 22 may still be inserted through the clamp 10 and into the end of the pipe 12. In another embodiment, the side wall 28 includes a hole 48, or witness window. The hole 48 is proximate to the first end 24 of the clamp 10, allowing a user to view the pipe 12 through the window 48 when the clamp 10 is placed on the pipe 12.

II. Operation

In operation, the second end 26 of the clamp 10 is positioned proximate to the end 23 of the pipe 12. A user will then slide the clamp 10 onto the end 23 of the pipe 12. As the clamp 10 slides onto the pipe 12, the lip 38 on the second end 26 of the clamp 10 serves to guide the pipe 12 into the clamp 10, and then the ribs 14 engage the outer surface 19 of the pipe 12, creating a friction fit between the ribs 14 and the pipe 12 for crimping. The pipe 12 is slid onto the clamp 10 until the end 23 of the pipe 12 contacts the inner surface 50 of the flange 16, and the pipe 12 is visible through the window 48. The flange 16 prevents the clamp 10 from sliding farther onto the pipe 12, and the friction fit created by the ribs 14 prevents the clamp from sliding off the pipe 12 without a force being applied by the user. Once the clamp 10 is in place, the insert 21 of the fitting 22 is inserted into the end 23 of the pipe 12, and the clamp 10 is crimped with a crimping tool to compress the clamp 10 onto the pipe 12, and compress the pipe 12 onto the fitting 22.

III. Second Embodiment

FIGS. 8-15 show a second embodiment of the present invention. In this embodiment, the clamp 100 includes a crimping ear 102. The crimping ear 102 is generally a U-shaped section that extends radially outward from the ear 100. The ear 102 includes a mouth 105 that opens towards the center of the clamp 100 and the pipe 112. The mouth 105 forms a gap in the circumference of the cylindrical side wall 128 that can be drawn together to tighten the clamp 100 onto the pipe 112. A tongue 104 is disposed between the ear 102 and the pipe to overlie the mouth 105 of the ear 102. The tongue 104 is connected to the ear 102 with a strap 106. The clamp 100 of this embodiment preferably includes the lip 138 and ribs 114 of the previously disclosed embodiment, but they are not necessary.

Figure 8:
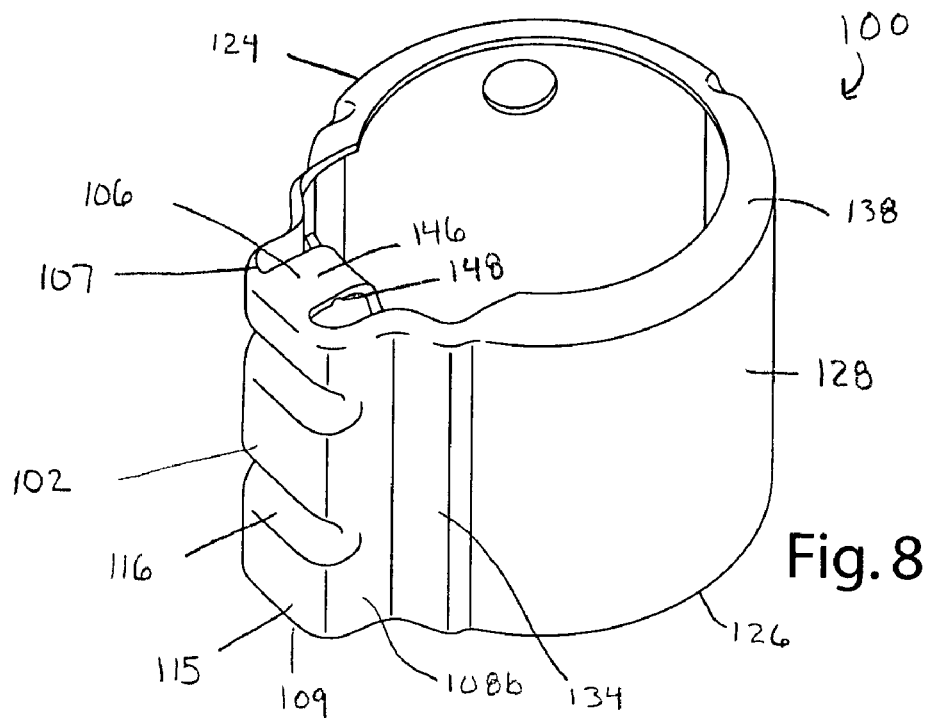
FIG. 8 is a top perspective view of a second embodiment of the clamp.
Figure 9:
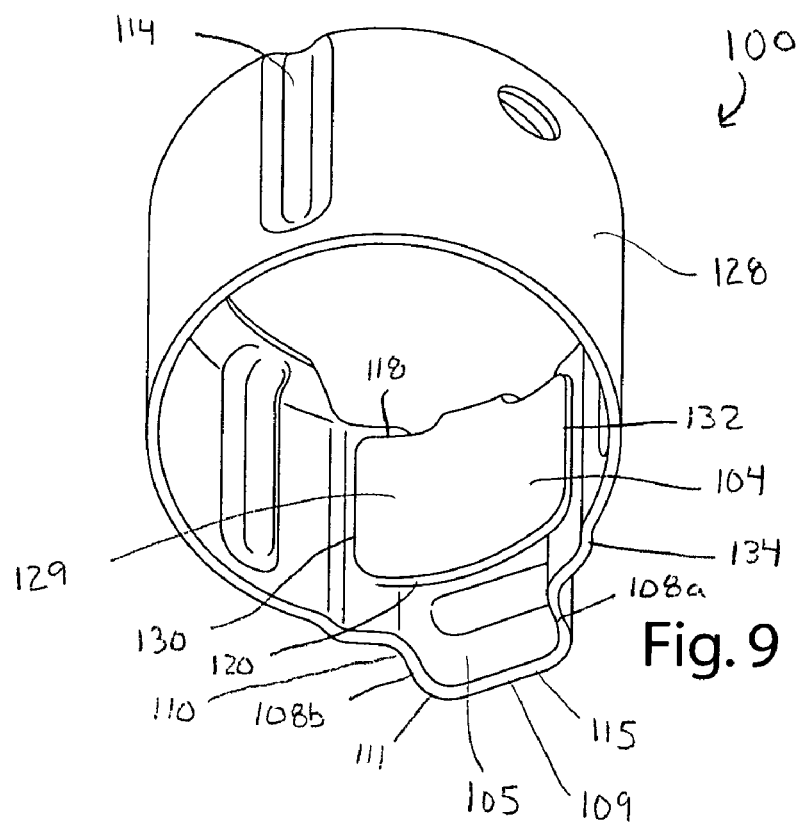
FIG. 9 is a bottom perspective view of the second embodiment.
Figure 10:
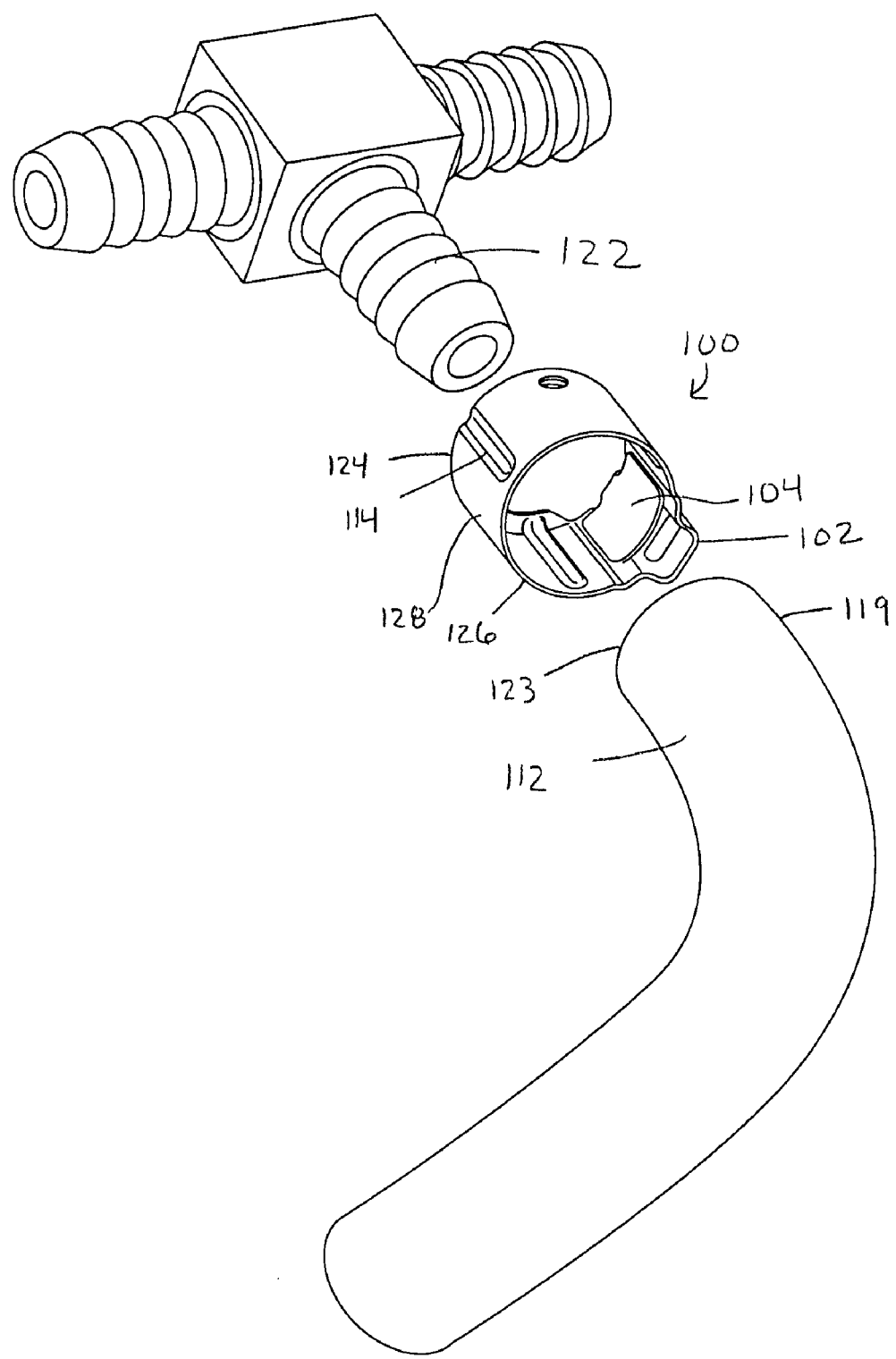
FIG. 10 is a perspective exploded view of the second embodiment in combination with a pipe and a fitting.
Figure 11:
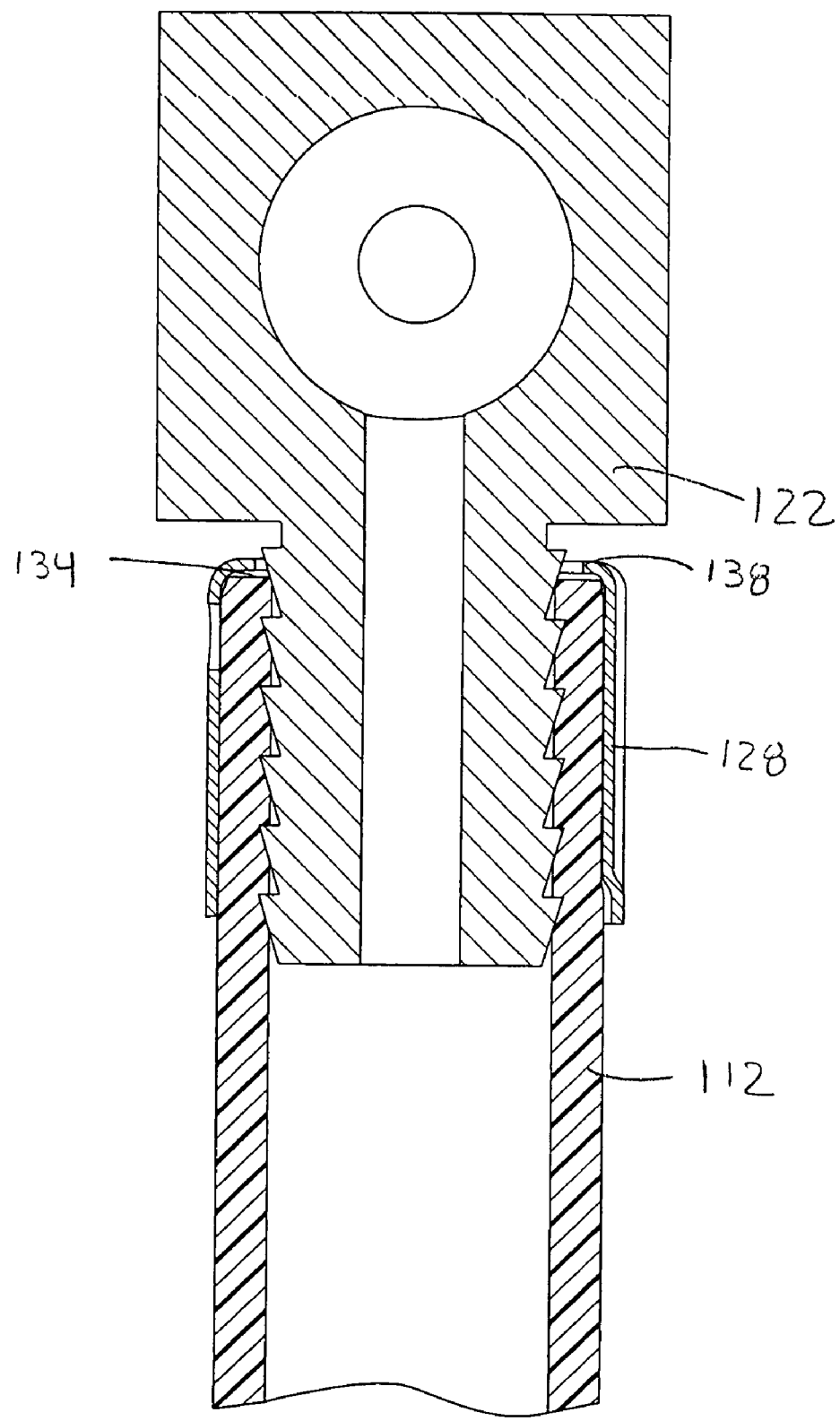
FIG. 11 is a front sectional view of the second embodiment.
Figure 12:
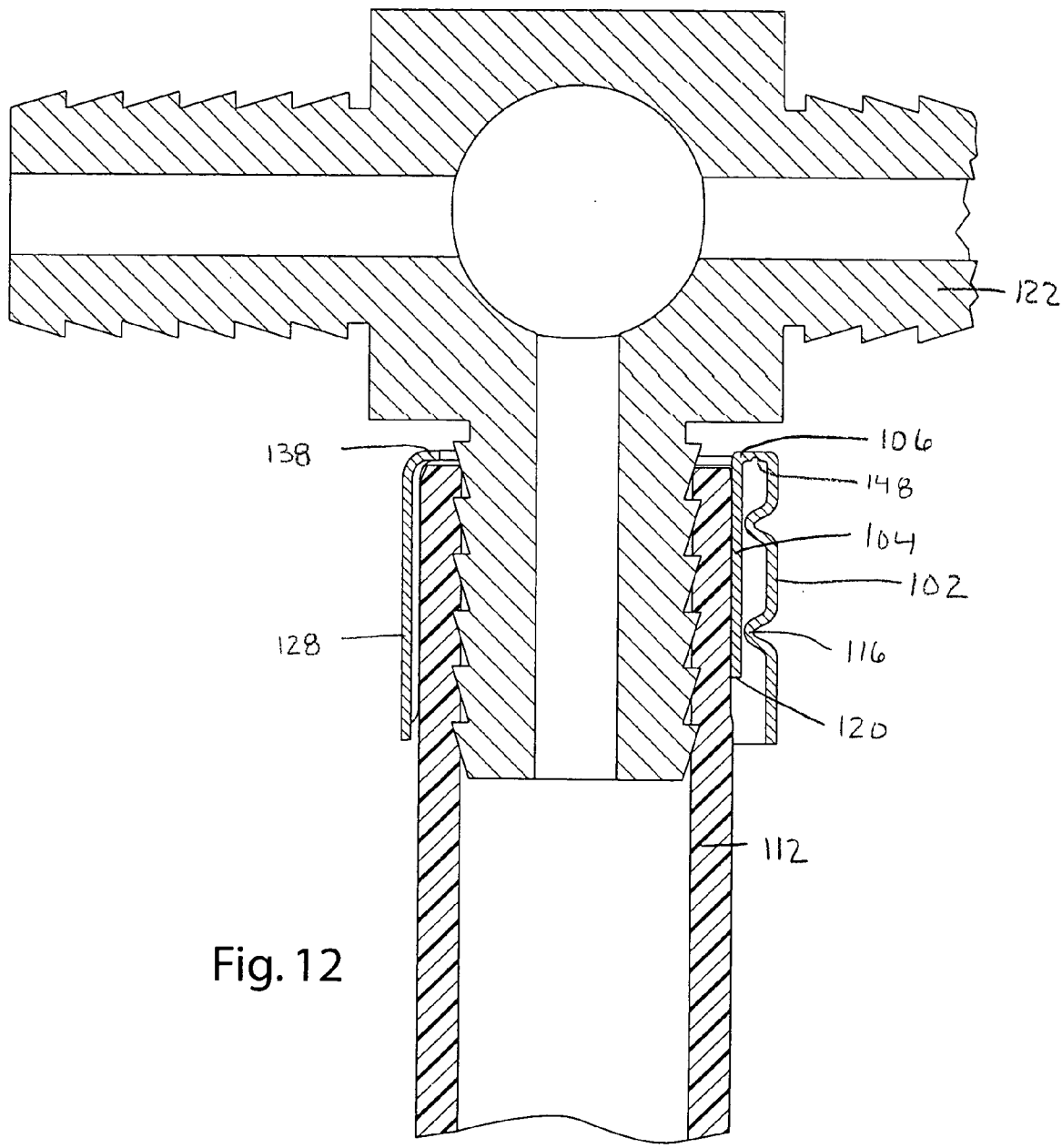
FIG. 12 is a side sectional view of the second embodiment.

The crimping ear 102 includes a pair of legs 108a-b extending radially outward from the side wall 128. The legs 108a-b each include a first end 110, and a second end 111. The first ends 110 extend from the side wall 128 in a direction radially outward from the side wall 128. The first ends 110 are spaced to define a gap in the side wall 128 that forms the mouth 105 of the ear 102. The second ends 111 are joined together by a base 115. The base 115 spans the gap between the two legs 108a-b and includes a top edge 107 and a bottom edge 109 that are generally flush with the first and second ends 124 and 126 of the side wall 128 respectively. The base 115 may further include one or more support ribs 116. The support ribs 116 are conventional, and as shown in FIG. 8 define a pair of relatively narrow parallel deformations 116 extending across the entire base 115 from the first leg 108a to the second leg 108b.

The tongue 104 is generally a plate that is positioned underneath the ear 102 between the ear 102 and the pipe 112. The tongue 104 overlies the mouth 105 of the ear 102 and can engage the pipe 112. The tongue 104 may be curved so that it corresponds to the curvature of the side wall 128 and the tongue 104 includes an inner surface 129 that is shaped to engage the pipe 112. As shown, the tongue 104 includes a top edge 118 proximate the first side 124 of the side wall 128 and a bottom edge 120 that extends inside the clamp 100 towards the second end 126 of the side wall 128. The tongue further includes first and second side edges 130 and 132. The distance between the side edges 130 and 132 is slightly wider than the gap between the legs 108a-b so that the tongue 104 is slightly wider than the mouth 105 of the ear 102. As shown, the side wall 128 may include an outward deformation 134 to accommodate for the tongue 104 and allow the tongue 104 to be in line with the side wall 128 to complete the circumference of the clamp 100. The deformation 134 may be wider than the distance between the side edges 130 and 132 of the tongue 104, forming gaps 139 and 140 between the side edges 130, 132 and the deformation 134 on opposite sides of the tongue 104.

Figure 13:
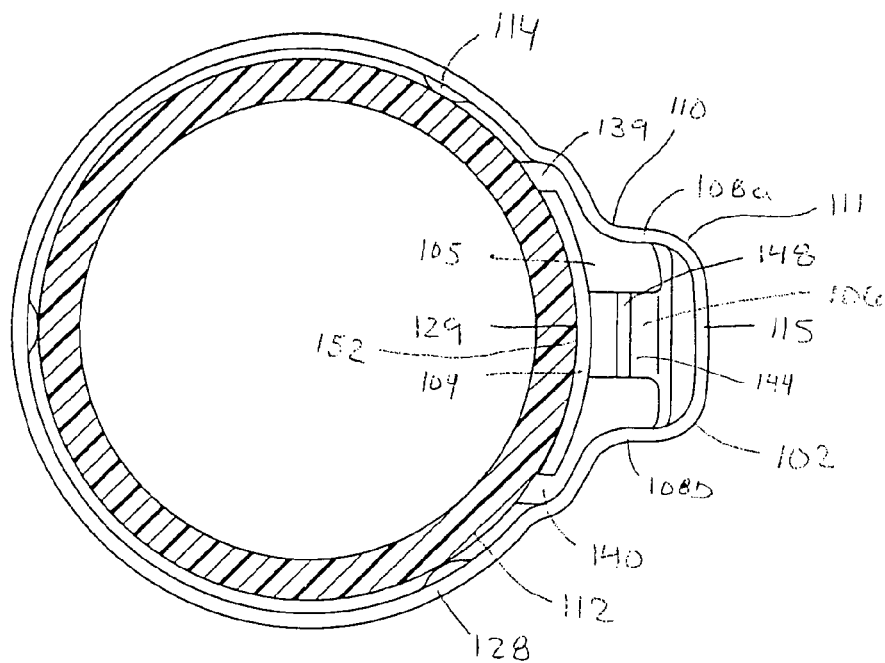
FIG. 13 is a top sectional view of the second embodiment in combination with a pipe.
Figure 14:
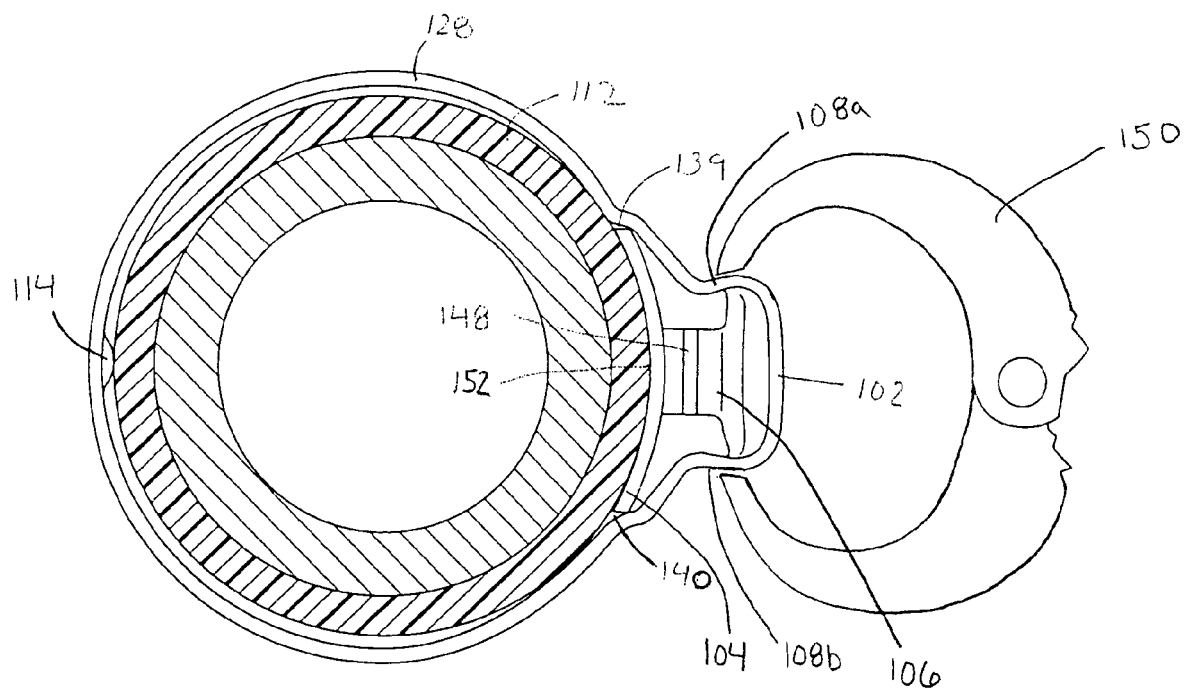
FIG. 14 is a top sectional view of the second embodiment in combination with a pipe and a fitting.
Figure 15:
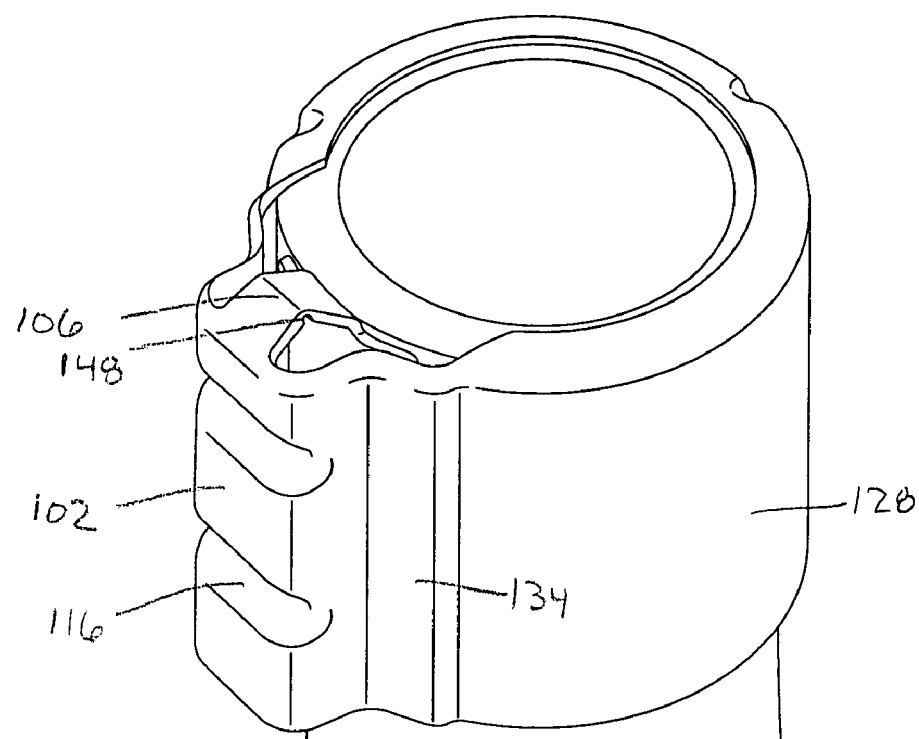
FIG. 15 is a perspective view of the second embodiment in combination with a pipe with the strap in a deformed position.

As shown in FIGS. 13-15 the tongue 104 may be attached to the clamp 100 by a strap 106. The strap 106 is generally attached between the top edge 107 of the ear 102 and the top edge 118 of the tongue 104. Alternatively, the strap 106 may be attached between the bottom edge 120 of the tongue 104 and the bottom edge 109 of the ear 102, or to a variety of other locations on the tongue 104 and the clamp 100. As disclosed, the strap 106 includes a lower surface 144 and an upper surface 146. The strap 106 may include one or more score lines 148 or similar deformations that allow the strap 106 to deform when the legs 108a-b ear 102 are crimped together. As shown, the score line 148 is located on the lower surface 144 of the strap 106 near the center of the strap 106, however, it may be placed at a variety of locations on the strap 106.

In operation, the clamp 100 is placed over the pipe 112 in the same manner as disclosed in the first embodiment. If the clamp 100 includes a lip 138 and/or ribs 114, the clamp 100 is positioned so that the end 123 of the pipe 112 engages the lip 138. The ribs 114 form a friction fit with the outer wall 119 of the pipe 112. The inner surface 129 of the tongue 104 is positioned against or near the outer wall 119 of the pipe 112. Once the clamp 100 is properly positioned, a fitting 122 is inserted into the pipe 112, and the clamp 100 is crimped by pressing the legs 108a-b of the ear 102 towards each other—usually with a crimping tool 150—to close the mouth 105 of the ear and pull the clamp 100 tight about the pipe 112 and fitting 122. The gaps 139 and 140 are narrowed when the ear 102 is crimped so that approximately the entire circumference of the pipe 112 is compressed, including the area 152 underneath the ear 102, which is compressed with the inner surface 129 of the tongue 104. Additionally, as shown in FIG. 15, the strap 106 may deform in the area of the score lines 148 as the ear 102 is crimped so that the strap 106 bows outwards (i.e. away from the rest of the clamp 100). In order to remove the clamp 100 for any reason, the strap 106 may be cut with a metal cutter, and the tongue 104 may be pulled from inside the clamp 100. This relieves some of the compression of the clamp 100, allowing the clamp 100 to be pulled from the pipe.

The above description is that of the current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A one-piece unitary compression clamp comprising:
a generally cylindrical wall;
a crimping ear extending radially outward from said cylindrical wall, said crimping ear including a mouth that defines a gap in said cylindrical wall; and
a tongue unitary with said cylindrical wall, said tongue extending inside said cylindrical wall and across said mouth.

2. The compression clamp of claim 1 wherein said tongue is attached to said ear by a strap, said strap including an inner surface having at least one score line.

3. The compression clamp of claim 2 wherein said cylindrical wall defines an internal deformation aligned with said gap, said tongue located within said deformation to align said tongue with said gap.

4. The compression clamp of claim 2 comprising a plurality of said inward deformations approximately evenly spaced about the circumference of said wall.

5. The compression clamp of claim 2 wherein said wall includes a shoulder at one end of said wall and defines a hole proximate said one end proximate said shoulder.

6. The compression clamp of claim 2 wherein said inward deformation comprises at least one longitudinal rib.

7. The compression clamp of claim 2 wherein the other end of said wall flares radially outwardly.

8. A method of mounting a conduit on a fitting comprising the steps of:
positioning a one-piece unitary compression clamp on one end of the conduit, the clamp including a crimping ear having a mouth and a tongue, the tongue positioned between the mouth and the conduit and overlying the mouth, the tongue unitary with the crimping ear;
positioning the one end of the conduit on the fitting; and
crimping the ear to close the mouth and to compress the tongue against the conduit and secure the conduit on the fitting.

9. The method of claim 8 wherein the tongue is connected to the ear with a strap, the strap deforming as the ear is crimped.

10. The method of claim 8 wherein the clamp includes at least one inwardly extending deformation providing an interference fit between the clamp and the conduit.

11. A one piece unitary compression clamp comprising:
a generally cylindrical wall;
a crimping ear extending from said cylindrical wall and defining a gap in said cylindrical wall, said crimping ear including a pair of legs extending radially outwardly from said cylindrical wall and a base spanning said gap and joining said legs;
a tongue having an end connected to said crimping ear, said tongue overlying substantially all of said gap; and
a strap attached between said end of said tongue and said crimping ear base, said strap including a deformable score line.

12. The compression clamp of claim 11 wherein said cylindrical wall has opposite longitudinal ends, a shoulder extending radially inwardly from one of said ends, and at least one inward deformation in said cylindrical wall.

13. The compression clamp of claim 12 wherein said inward deformation comprises at least one longitudinal rib.

14. The compression clamp of claim 12 comprising a plurality of said deformations approximately evenly spaced about the circumference of said wall.

15. The compression clamp of claim 12 wherein said wall defines a hole proximate said one end proximate said shoulder.

16. A one piece unitary compression clamp comprising:
a generally cylindrical wall;
a crimping ear unitary with said cylindrical wall and extending from said cylindrical wall, said crimping ear including a pair of legs extending radially outwardly from said cylindrical wall and defining a gap in said cylindrical wall, said crimping ear including a base spanning said gap and joining said legs;
a tongue extending inwardly from said crimping ear such that said tongue is positioned inside said cylindrical wall, said tongue overlying substantially all of said gap.

* * * * *